W. S. GOULD.
STORAGE BATTERY.
APPLICATION FILED FEB. 17, 1920.
1,363,645.
Patented Dec. 28, 1920.
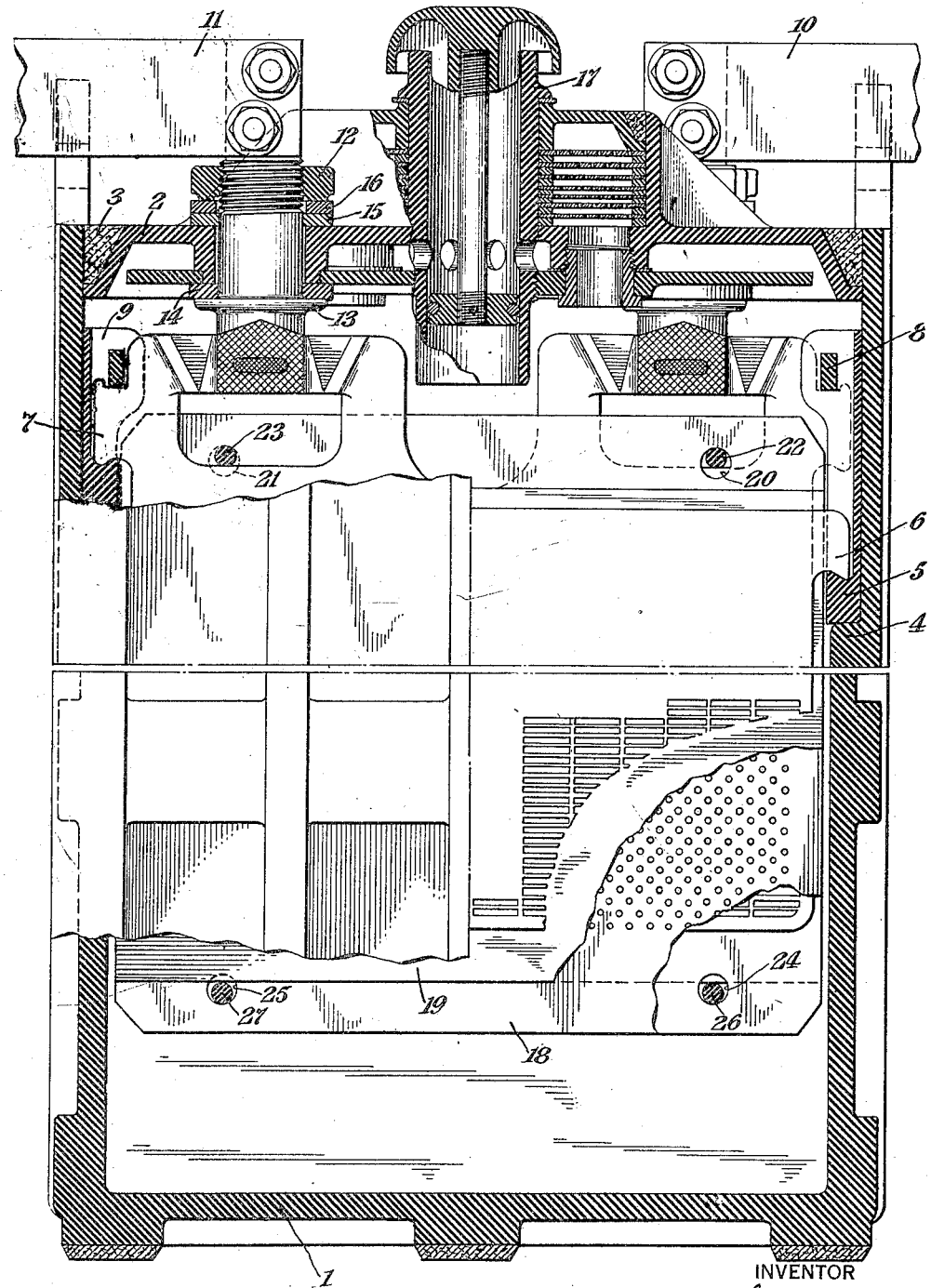
INVENTOR
William S. Gould
BY
Kenyon & Kenyon
his ATTORNEYS

UNITED STATES PATENT OFFICE.

WILLIAM S. GOULD, OF NEW YORK, N. Y., ASSIGNOR TO GOULD STORAGE BATTERY COMPANY, A CORPORATION OF NEW YORK.

STORAGE BATTERY.

1,363,645.   Specification of Letters Patent.   Patented Dec. 28, 1920.

Application filed February 17, 1920. Serial No. 359,256.

*To all whom it may concern:*

Be it known that I, WILLIAM S. GOULD, a citizen of the United States, and a resident of the city, county, and State of New York, have invented certain new and useful Improvements in Storage Batteries, of which the following is a specification.

My invention relates to storage batteries and particularly to means for supporting separators which are placed between the positive and negative plates in the battery.

It has been customary heretofore to support the separators by allowing their lower edge to rest upon ribs or projections in the bottom of the battery cell. This means of supporting the separator has the disadvantage that the separators work down on account of the movement of the elements in the jar and the friction of the separators being drawn across the top of the supports. The provision of the supports also complicates the bottom of the jar or container and interferes with the removal of sediment which inevitably accumulates in the bottom of the cell.

My invention has the advantage of eliminating the ribs in the bottom of the jar, thus making it easier to remove sediment and the further advantage that these separators form, with the other parts of the battery, a unit with which the separators are removed when it is necessary to so remove the plates for repair or other reasons.

My invention is shown in the attached drawing which accompanies this specification and forms a part thereof.

In the drawing is shown a sectional view of a battery with certain parts broken away to show their relation to each other.

The battery comprises a jar or container 1 of hard rubber or other suitable material provided with a cover 2, which is sealed by suitable compound 3 after being placed on the jar.

The jar is offset at 4 so as to form a ledge upon which rests a plate holder 5. One end of each plate rests at a point 6 and the other end at a higher point 7 on the opposite side of the cell and each of the plate holders 5 has a series of supporting points at the level of the point 6, and also a series of supporting points at the level of the point 7. After the plates are placed in position, as shown, an insulating strip 8 is passed through transversely the plates and engaging the upper part of the projection 7. These strips also pass through openings in projections 9 extending inwardly from the main body of the plate holders 5. When the strips 8 are placed in position the plates are bound together through the strips 8 and the plate holders 5 and the projections 6 and 7 on the plates.

Each of the plates of one polarity is connected to a terminal 10 in the usual way and each of the plates of the opposite polarity is connected to the terminal 11. These terminals pass through openings in the cover 2 and are fastened to the cover by means of nuts 12, which are screwed on to the terminals and by reason of which flange 13 is drawn upwardly against the cover and held and connected therewith through washers 14, 15 and 16. Suitable filling and ventilating means are provided in the center of the cover which means need not be described as they do not form a part of my invention.

Placed between each positive and negative plate is a separator composed of a perforated rubber sheet 18 and an unperforated wood or other sheet 19. In the upper part of rubber sheet 18 are two openings 20 and 21, through which rods 22 and 23, respectively, pass. These rods are of insulated material and rest upon the upper edge of the plates and thereby supporting the rubber sheets 18 from the top of the plates. The lower part of each sheet 18 is also provided with two openings 24 and 25, through which pass rods 26 and 27, respectively, which are also of insulated material. These rods, like the rods 22 and 23, extend transversely in the plate across the cell and the lower edge of the wood sheets 19 rests upon these rods 26 and 27, by which they are supported.

From the form it will be seen that the composite separator is carried by the plates through the rods 22 and 23 and 26 and 27, and by reason of this construction, the plates and the separators constitute a unit which when locked in place by the members 8 can readily be removed from the jar by lifting off the cover 2. By this construction, it will be noted also that there are no obstructions in the bottom of the jar, therefore, more room is provided for the collection of sediment to the consequent decrease in danger of short-circuit resulting from the building up of the sediment in the bottom until it comes into contact with the plates. By reason of this construction the unit may be easily and readily removed and the jar readily cleaned of sediment.

Having described my invention, what I claim as new and desire to secure by Letters Patent is:—

1. In a storage battery of the usual type, having positive and negative plates alternately arranged and separators between adjacent plates one composed of a fibrous material and another of non-fibrous, the combination of means for supporting separators in place comprising means for supporting the non-fibrous members from the plates and the fibrous members from the non-fibrous members 2. In a storage battery of the usual type, having positive and negative plates alternately arranged and separators between adjacent plates one composed of a fibrous material and another of non-fibrous material, the combination of means for supporting separators in place comprising means for supporting the non-fibrous members from the plates and means carried by the non-fibrous members for supporting the fibrous member.

3. In a storage battery of the usual type, having positive and negative plates alternately arranged and separators between adjacent plates one composed of a fibrous material and another of non-fibrous material, the combination of means for supporting separators in place comprising any plurality of rods resting on top of plates and extending through openings in the non-fibrous members and rods extending through openings in the bottom of the non-fibrous members upon which rods the fibrous members rest, whereby a larger space is provided in the bottom of the battery jar for sediment and the same is more readily removable.

4. In a storage battery of the usual type, having positive and negative plates alternately arranged and separators between adjacent plates one composed of a fibrous material and another of non-fibrous material, the combination of means for supporting separators in place comprising a supporting member on each side of the battery passing through openings in the upper part of the non-fibrous member and a supporting member passing through openings in the lower part of the non-fibrous member and upon which the fibrous members are supported.

In testimony whereof, I have signed my name to this specification.

WILLIAM S. GOULD.